UNITED STATES PATENT OFFICE.

FRITZ HOFMANN, CARL COUTELLE, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC-LIKE SUBSTANCE AND PROCESS OF MAKING SAME.

1,062,912.     Specification of Letters Patent.     Patented May 27, 1913.

No Drawing.     Application filed March 20, 1911. Serial No. 615,662.

*To all whom it may concern:*

Be it known that we, FRITZ HOFMANN, CARL COUTELLE, KONRAD DELBRÜCK, and KURT MEISENBURG, doctors of philosophy, chemists, citizens of the German Empire, residing at Elberfeld, Germany, have invented new and useful Improvements in Caoutchouc-Like Substances and Processes of Making Same, of which the following is a specification.

By our earlier applications Ser. Nos. 578607, 578608, 588173, 594095 and 594557 the production of caoutchouc like substances is described, which may replace natural caoutchouc in its chemical and technical application. The processes for their production consist in converting erythrene or its substitution products into caoutchouc like substances.

It has now been found that by using mixtures of the starting materials mentioned in the above applications (erythrene and its substitution products) new caoutchouc-like substances can be advantageously produced, with properties different from those of the caoutchouc-like substances above referred to. Caoutchouc-like substances can be thus produced of a composite nature, made up of the polymerization products of the mixtures of erythrene hydrocarbons, and containing such products in most intimate intermixture. A more nearly homogeneous product and a more intimate intermixture can thus be produced by mixing the hydrocarbons before or during the polymerization reaction than is possible by mixing the individual and isolated caoutchoucs already formed.

The present invention, which is of general application, is further illustrated by the following specific example of its application.

A mixture of 100 parts of alpha-phenyl-gamma-methylerythrene and 100 parts of cooled erythrene is heated for 6 weeks in an autoclave to 70° C. A very tough and elastic substance is thus obtained made up of the caoutchouc-like substance together with any remaining unchanged hydrocarbons and by-products. By treatment of this substance with steam such hydrocarbons and volatile by-products, if present, can be removed and the caoutchouc-like substance obtained. The process proceeds in an analogous manner on using agents promoting the polymerization *e. g.* acids or acid salts, etc. When such promoting agents are used, such as acetic acid, the time required for the completion of the process is appreciably shortened.

The new caoutchouc substances are white substances the color of which does not change. They swell up with chloroform or benzene to white hyaline substances from which the liquid can be poured off. They are free from protein substances, which are always contained in the natural caoutchouc and play an important part in it with regard to the elasticity of the natural caoutchouc. They form ozonids being thick oils, nitrosites and brom addition products. These ozonids, nitrosites and brom-addition products differ with the different composite caoutchouc products, and correspond to these different products, and thus indirectly to the particular mixtures of hydrocarbons of which the composite caoutchoucs are polymerization products. Thus the product produced as above described from a mixture of alpha-phenyl-gamma-methyl-erythrene and erythrene forms an ozonid, or mixture of ozonids, which upon decomposition with water yields a mixture of oxygen-containing decomposition products among which succinic aldehyde and alpha-phenyl-levulinic aldehyde are found.

We claim:—

1. The process of producing a caoutchouc-like substance which comprises polymerizing a mixture of erythrene hydrocarbons.

2. The process of producing a caoutchouc-like substance which comprises heating a mixture of erythrene hydrocarbons until a caoutchouc-like product results insoluble in acetone.

3. The process of producing a caoutchouc-like substance which comprises polymerizing a mixture of erythrene hydrocarbons in the presence of an agent promoting the polymerization.

4. The process of producing a caoutchouc-like substance which comprises polymerizing a mixture of erythrene hydrocarbons in the presence of an agent of acid reaction.

5. The process of producing a caoutchouc-like substance which comprises heating a mixture of erythrene hydrocarbons in the presence of an agent promoting the polymerization until a caoutchouc-like product results insoluble in acetone.

6. The process of producing a caoutchouc-like substance which comprises heating a mixture of erythrene hydrocarbons in the presence of an agent of acid reaction until a caoutchouc-like product results insoluble in acetone.

7. The process of producing a caoutchouc-like substance which comprises polymerizing a mixture of erythrene hydrocarbons comprising a phenyl-substituted erythrene.

8. The process of producing a caoutchouc-like substance which comprises polymerizing a mixture of erythrene hydrocarbons comprising erythrene and a phenyl-substituted erythrene.

9. As a new product a caoutchouc-like polymerization product of a mixture of erythrene hydrocarbons.

10. As a new product a caoutchouc-like polymerization product of a mixture of erythrene hydrocarbons including a phenyl-substituted erythrene, which product forms a nitrosite, ozonid and brom-addition product, the ozonid upon decomposition with water yielding a plurality of oxygen-containing decomposition products including alpha-phenyl-levulinic aldehyde.

11. As a new product a caoutchouc-like polymerization product of a mixture of erythrene hydrocarbons including erythrene and a phenyl-substituted erythrene, which product forms a nitrosite, ozonid and brom-addition product, the ozonid upon decomposition with water yielding a plurality of oxygen-containing decomposition products including succinic aldehyde and alpha-phenyl-levulinic aldehyde.

In testimony whereof we have hereunto set our hands in the presence of two subscribing witnesses.

FRITZ HOFMANN. [L. S.]
CARL COUTELLE. [L. S.]
KONRAD DELBRÜCK. [L. S.]
KURT MEISENBURG. [L. S.]

Witnesses:
ALFRED HENKEL,
A. POSEN.